United States Patent
Chappalli et al.

(10) Patent No.: US 11,941,783 B2
(45) Date of Patent: Mar. 26, 2024

(54) SCALER DE-RINGING IN IMAGE PROCESSING CIRCUITRY

(71) Applicant: Apple Inc., Cupertino, CA (US)

(72) Inventors: Mahesh B. Chappalli, San Jose, CA (US); Vincent Z. Young, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 383 days.

(21) Appl. No.: 17/149,425

(22) Filed: Jan. 14, 2021

(65) Prior Publication Data

US 2022/0067885 A1 Mar. 3, 2022

Related U.S. Application Data

(60) Provisional application No. 63/072,086, filed on Aug. 28, 2020.

(51) Int. Cl.
| | |
|---|---|
| *G06T 5/00* | (2006.01) |
| *G06T 1/20* | (2006.01) |
| *G06T 3/40* | (2006.01) |
| *G06T 3/4007* | (2024.01) |
| *G06T 5/50* | (2006.01) |

(52) U.S. Cl.
CPC ............. *G06T 5/002* (2013.01); *G06T 1/20* (2013.01); *G06T 3/4007* (2013.01); *G06T 5/50* (2013.01)

(58) Field of Classification Search
CPC ......... G06T 5/002; G06T 1/20; G06T 3/4007; G06T 5/50; G06T 2207/20221; G06T 3/4015; G06T 3/403
See application file for complete search history.

(56) References Cited

U.S. PATENT DOCUMENTS

| | | | | |
|---|---|---|---|---|
| 7,031,552 | B2 * | 4/2006 | Kim ..................... | H04N 19/117 |
| | | | | 375/E7.193 |
| 7,782,401 | B1 * | 8/2010 | Chou ..................... | G06T 3/403 |
| | | | | 348/625 |
| 11,528,493 | B2 * | 12/2022 | Bae ....................... | H04N 19/159 |
| 2005/0249413 | A1 * | 11/2005 | Lin ....................... | G06V 30/413 |
| | | | | 382/176 |
| 2013/0162901 | A1 * | 6/2013 | Thompson ........... | H04N 7/0117 |
| | | | | 348/E7.003 |
| 2016/0125567 | A1 * | 5/2016 | Yoon ..................... | G09G 5/393 |
| | | | | 345/505 |
| 2019/0045168 | A1 * | 2/2019 | Chaudhuri ........... | H04N 13/139 |
| 2020/0143512 | A1 * | 5/2020 | Huang ................... | G06T 7/10 |
| 2020/0387730 | A1 * | 12/2020 | Funato ................. | G06V 30/153 |
| 2022/0230323 | A1 * | 7/2022 | Liba ........................ | G06T 5/008 |

* cited by examiner

*Primary Examiner* — Edward F Urban
*Assistant Examiner* — Benedict E Lee
(74) *Attorney, Agent, or Firm* — Fletcher Yoder, P.C.

(57) ABSTRACT

Methods and systems include receiving, at de-ringing circuitry of a display pipeline of an electronic device, scaled image content based on image data. The de-ringing circuitry also receives a fallback scaler output. The de-ringing circuitry determines whether the image data has a change frequency greater than a threshold. In response to the change frequency being above the threshold, the de-ringing circuitry determines a weight. Based at least in part on the weight, the de-ringing circuitry blends the scaled image content and the fallback scaler output based at least in part on the weight.

16 Claims, 8 Drawing Sheets

SCALER DE-RINGING IN IMAGE PROCESSING CIRCUITRY

CROSS-REFERENCE TO RELATED APPLICATIONS

This application claims priority to U.S. Provisional Patent Application No. 63/072,086, entitled "Scaler De-Ringing in Image Processing Circuitry," filed Aug. 28, 2020, which this application incorporates in its entirety for all purposes.

BACKGROUND

The present disclosure relates generally to hardware accelerators in an electronic device and, more particularly, to reducing image artifacts in image processing circuitry.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Image content may be scaled in a display pipeline. However, when the image content has sharp transitions, scaling the image content may cause the display of ringing artifacts around the sharp transitions due, at least in part, to the scaled sharp transitions in the image data.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "one embodiment," "an embodiment," "embodiments," and "some embodiments" of the present disclosure are not intended to be interpreted as excluding the existence of additional embodiments that also incorporate the recited features.

Image content may be scaled in a display pipeline. However, when the image content has sharp transitions, scaling the image content may cause the display of ringing artifacts around the sharp transitions due, at least in part, to the scaled sharp transitions in the image data. To address such ringing, de-ringer(s) may enable de-ringing modes in a scaler. The de-ringer(s) detects areas with sharp transitions around which ringing artifacts are expected. The de-ringer(s) may blend an original polyphase scaler output of the scalers with a fallback scaler output (e.g., linear interpolation) that does not produce ringing. In areas of high frequency, the de-ringing algorithm may fall back to using the original polyphase scaler output for better aliasing suppression.

Figure 1:
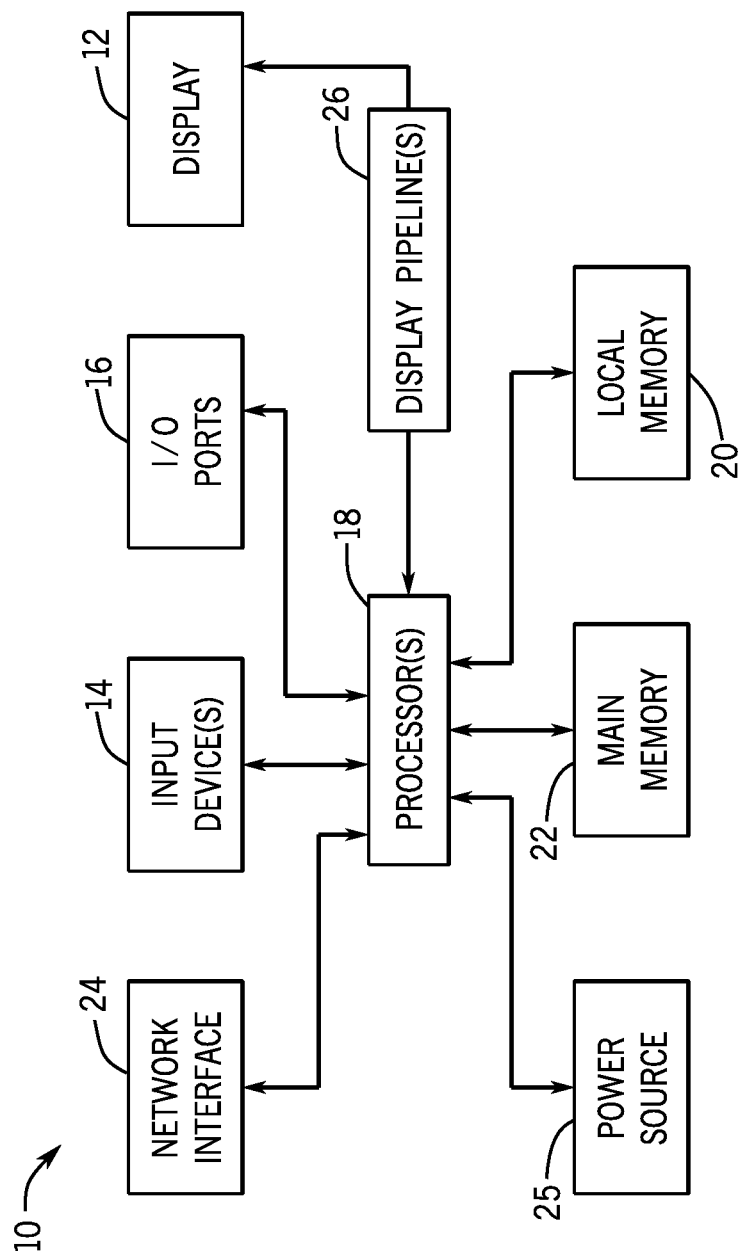
FIG. 1 is a block diagram of an electronic device with a display pipeline used to manipulate image content to be displayed on a display, in accordance with an embodiment of the present disclosure.

As will be described in more detail below, an electronic device 10 that uses such de-ringing techniques, such as the electronic device 10 shown in FIG. 1, may be any suitable electronic device, such as a computer, a mobile phone, a portable media device, a wearable device, a tablet, a television, a virtual-reality headset, and the like. Thus, it should be noted that FIG. 1 is merely an example of a particular implementation and is intended to illustrate the types of components that may be present in the electronic device 10.

In the depicted embodiment, the electronic device 10 includes the electronic display 12, one or more input devices 14, one or more input/output (I/O) ports 16, a processor 18 having one or more processor(s) or processor cores, local memory 20, a main memory storage device 22, a network interface 24, a power source 25, and a display pipeline 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

The processor 18 may execute instruction stored in local memory 20 and/or the main memory storage device 22 to perform operations, such as generating and/or transmitting image data. As such, the processor 18 may include one or more processors, such as one or more microprocessors, one or more application specific processors (ASICs), one or more field programmable logic arrays (FPGAs), one or more graphics processing units (GPUs), or the like. Furthermore, as previously noted, the processor 18 may include one or more separate processing logical cores that each process data according to executable instructions.

The local memory 20 and/or the main memory storage device 22 may store the executable instructions as well as data to be processed by the cores of the processor 18. Thus, the local memory 20 and/or the main memory storage device 22 may include one or more tangible, non-transitory, computer-readable media. For example, the local memory 20 and/or the main memory storage device 22 may include random access memory (RAM), read only memory (ROM), rewritable non-volatile memory such as flash memory, hard drives, optical discs, and the like.

The network interface 24 may facilitate communicating data with other electronic devices via network connections. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G, LTE, or 5G cellular network. The network interface 24 includes one or more antennas configured to communicate over network(s) connected to the electronic device 10.

The power source 25 may include any suitable source of energy, such as a rechargeable lithium polymer (Li-poly) battery and/or an alternating current (AC) power converter.

The I/O ports 16 may enable the electronic device 10 to receive input data and/or output data using port connections. For example, a portable storage device may be connected to an I/O port 16 (e.g., Universal Serial Bus (USB)), thereby enabling the processor 18 to communicate data with the portable storage device. The I/O ports 16 may include one or more speakers that output audio from the electronic device 10. The processor 18 may include one or more coprocessors or other microprocessors configured to supplement the capabilities of a primary processor (e.g., central processing unit).

The input device 14 may facilitate user interaction with the electronic device 10 by receiving user inputs. For example, the input devices 14 may include one or more buttons, keyboards, mice, trackpads, and/or the like. The input devices 14 may also include one or more microphones that may be used to capture audio.

The input devices 14 may include touch-sensing components in the electronic display 12. In such embodiments, the touch sensing components may receive user inputs by detecting occurrence and/or position of an object touching the surface of the electronic display 12.

The electronic display 12 may include a display panel with one or more display pixels. The electronic display 12 may control light emission from the display pixels to present visual representations of information, such as a graphical user interface (GUI) of an operating system, an application interface, a still image, or video content, by display image frames based at least in part on corresponding image data. For example, the electronic display 12 may be used to display a voice memorandum application interface for a voice memorandum application that may be executed on the electronic device 10. In some embodiments, the electronic display 12 may be a display using liquid crystal display (LCD), a self-emissive display, such as an organic light-emitting diode (OLED) display, or the like.

The display pipeline(s) 26 may include hardware, software, and/or firmware used to process and/or modify image data that is to be displayed on the electronic display 12 from the processor 18. Portions of the display pipeline(s) 26 may be located in on or more locations. For example, some functionality of the display pipeline(s) 26 may be implemented using the processor 18 while other functionality may be implemented in the electronic display 12 or between the processor 18 and the electronic display 12. The display pipeline(s) 26 may encapsulate memory management, line buffers, image data conversion, scaling, color space conversion, blending between different display pipeline(s) 26, and/or other pre-blend color management blocks.

Figure 2:
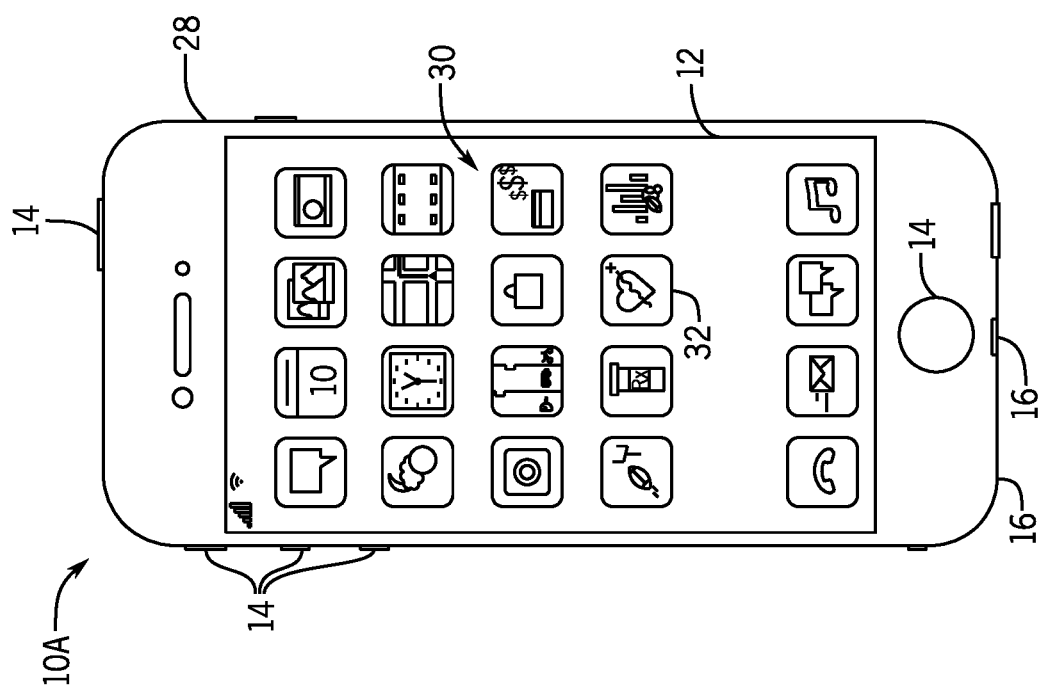
FIG. 2 is one example of the electronic device of FIG. 1, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any IPHONE® model available from Apple Inc.

As depicted, the handheld device 10A includes an enclosure 28 (e.g., housing). The enclosure 28 may protect interior components from physical damage and/or shield them from electromagnetic interference. Additionally, as depicted, the enclosure 28 surrounds at least a portion of the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, a corresponding application may launch.

Furthermore, as depicted, input devices 14 may extend through the enclosure 28. As previously described, the input devices 14 may enable a user to interact with the handheld device 10A. For example, the input devices 14 may enable the user to record audio, to activate or deactivate the handheld device 10A, to navigate a user interface to a home screen, to navigate a user interface to a user-configurable application screen, to activate a voice-recognition feature, to provide volume control, and/or to toggle between vibrate and ring modes. As depicted, the I/O ports 16 also extends through the enclosure 28. In some embodiments, the I/O ports 16 may include an audio jack to connect to external devices. As previously noted, the I/O ports 16 may include one or more speakers that output sounds from the handheld device 10A.

Figure 3:
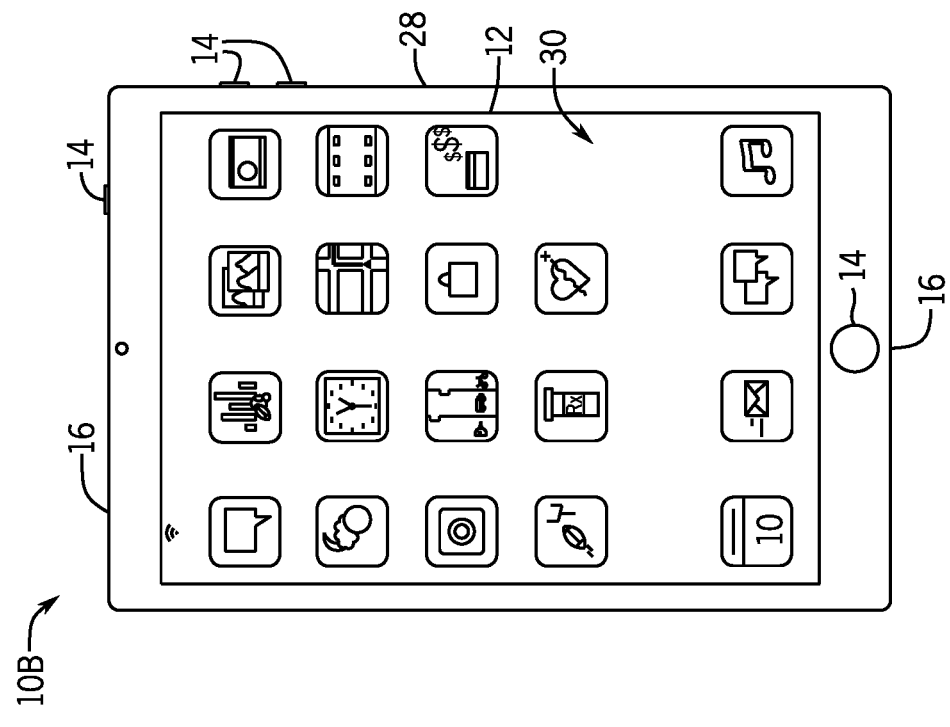
FIG. 3 is another example of the electronic device of FIG. 1, in accordance with an embodiment of the present disclosure.
Figure 4:
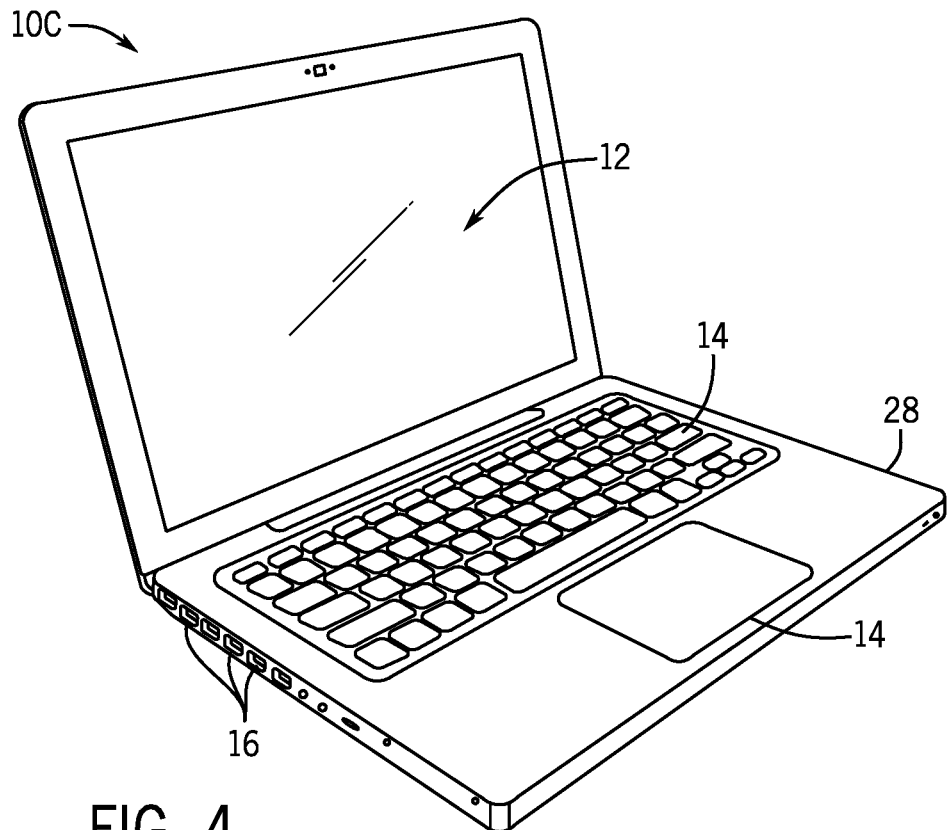
FIG. 4 is another example of the electronic device of FIG. 1, in accordance with an embodiment of the present disclosure.
Figure 5:
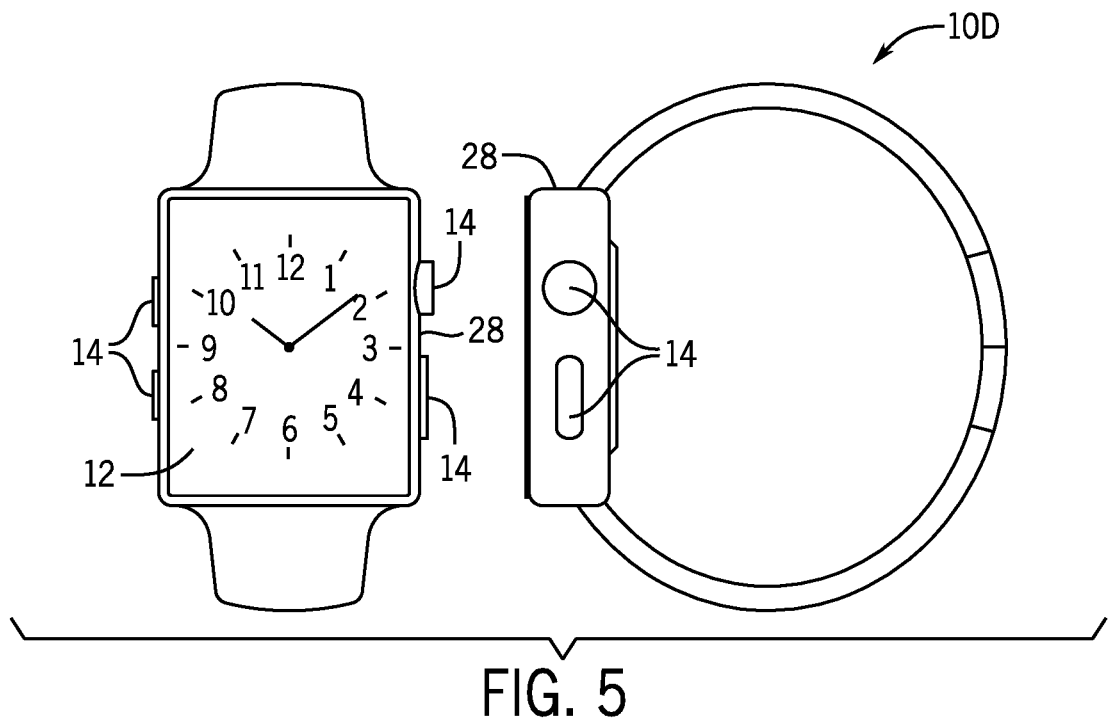
FIG. 5 is another example of the electronic device of FIG. 1, in accordance with an embodiment of the present disclosure.

To further illustrate an example of a suitable electronic device 10, specifically a tablet device 10B, is shown in FIG. 3. For illustrative purposes, the tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a wearable device 10D, is shown in FIG. 5. For illustrative purposes, the wearable device 10D may be any APPLE WATCH® model available from Apple Inc. As depicted, the tablet device 10B, the computer 10C, and the wearable device 10D each also includes an electronic display 12, input devices 14, and an enclosure 28.

Figure 6:
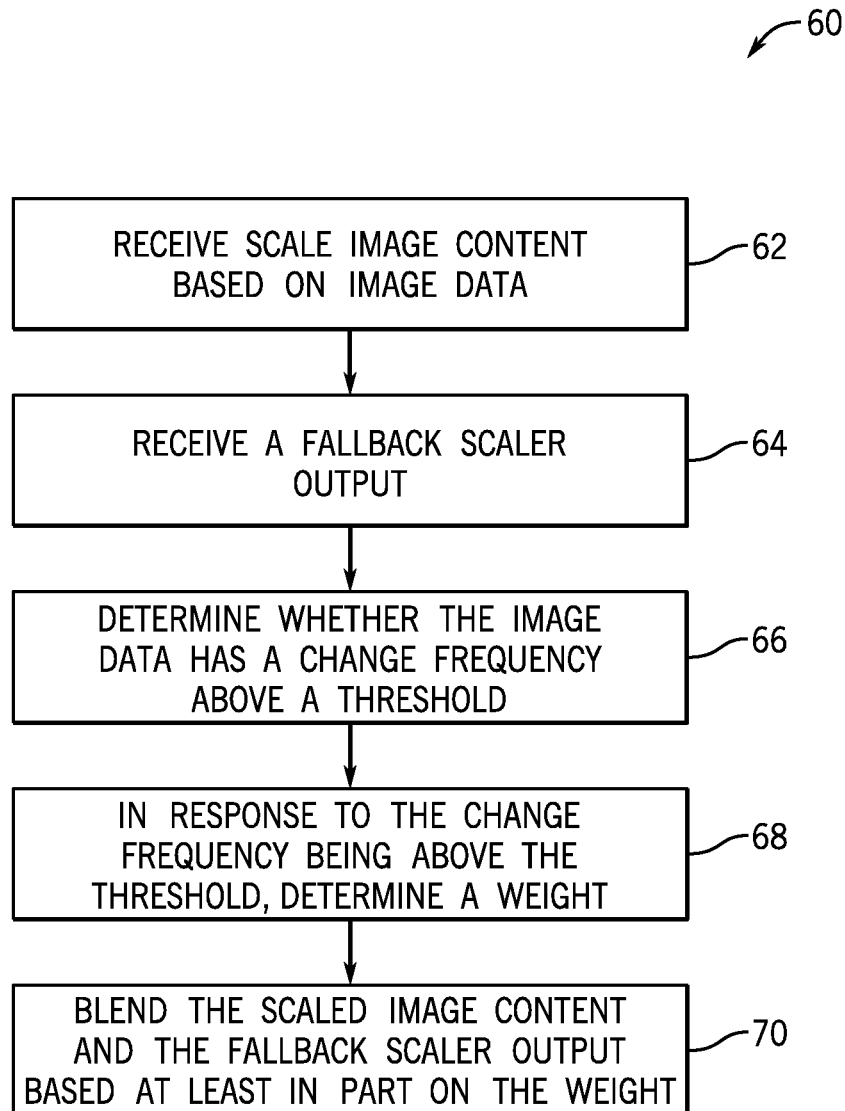
FIG. 6 is a flow diagram of a process for driving a display using the display pipeline of FIG. 1 using de-ringing of the image content, in accordance with an embodiment of the present disclosure.

FIG. 6 is a flow diagram of a process 60 that may be used to perform de-ringing of scaled image content. Specifically, as discussed below, the de-ringing circuitry receives scaled image content from a respective scaler that scales image data (block 62). For instance, the scaled image content may include scaled values for one or more pixels of the image data. The de-ringing circuitry also receives a fallback scaler output (block 64). The fallback scaler output may have a different type or level of scaling (e.g., no scaling) than in the scaled image content and may be less prone to ringing artifacts than the scaled image data that has a high frequency of changes in the image data. For instance, the scaled image content may utilize linear-interpolation-based scaling that is more prone to ringing artifacts while the fallback scaler output uses an alternative scaling mechanism.

The de-ringing circuitry detects whether the image data has a change frequency above a threshold (e.g., a high frequency) of changes (block 66). For example, the de-ringing circuitry may determine whether one or more areas or "neighborhoods" have a number (e.g., more than two) and/or size of different high-frequency changing regions/pixels.

The de-ringing circuitry determines an amount of weighting to apply to the scaled image data and/or the fallback scaler output based at least in part on the determination that the image data has a high frequency (block 68). For instance, if a neighborhood has a large region with a high-frequency change, a first weight may be used with scaled image data heavily used. However, if a neighborhood has a number (e.g., more than one) of regions of different high-frequency changes, the fallback scaler output may be more heavily weighted than the large region weighting. The de-ringing circuitry also blends the scaled image content and the fallback scaler output using the weighting (block 70). The blending of the scaled image content and the fallback scaler output may be performed at locations around the pixels/regions with the high-frequency changes to blend edges between regions of high-frequency changes and the surrounding areas in their respective neighborhoods. When a high frequency is detected in the image data, the fallback scaler output may be weighted more heavily than the scaled image content to reduce the likelihood of visible ringing artifacts when the image data is displayed on the electronic display 12.

Furthermore, although the foregoing discusses determination of a high frequency above a threshold, a sliding scale may be used to determine the weighting of the fallback scaler output and the scaled image content. For example, the weighting may be calculated using a transfer function from detected frequency in the image data. Additionally or alternatively, multiple bins may be used with corresponding thresholds of image content frequency where each frequency in each bin between two respective thresholds is blended with weighting determined according to the respective bin. For example, in a lowest frequency bin, the scaled image content may be used entirely while the fallback scaler output is discarded. Additionally or alternatively, in a highest frequency bin, the scaled image content may be discarded while the fallback scaler output is used entirely. For the bins between the lowest and highest frequency bins, a sliding scale may be applied to use more of the scaled image content at lower frequencies and more of the fallback scaler output at higher frequencies.

Figure 7:
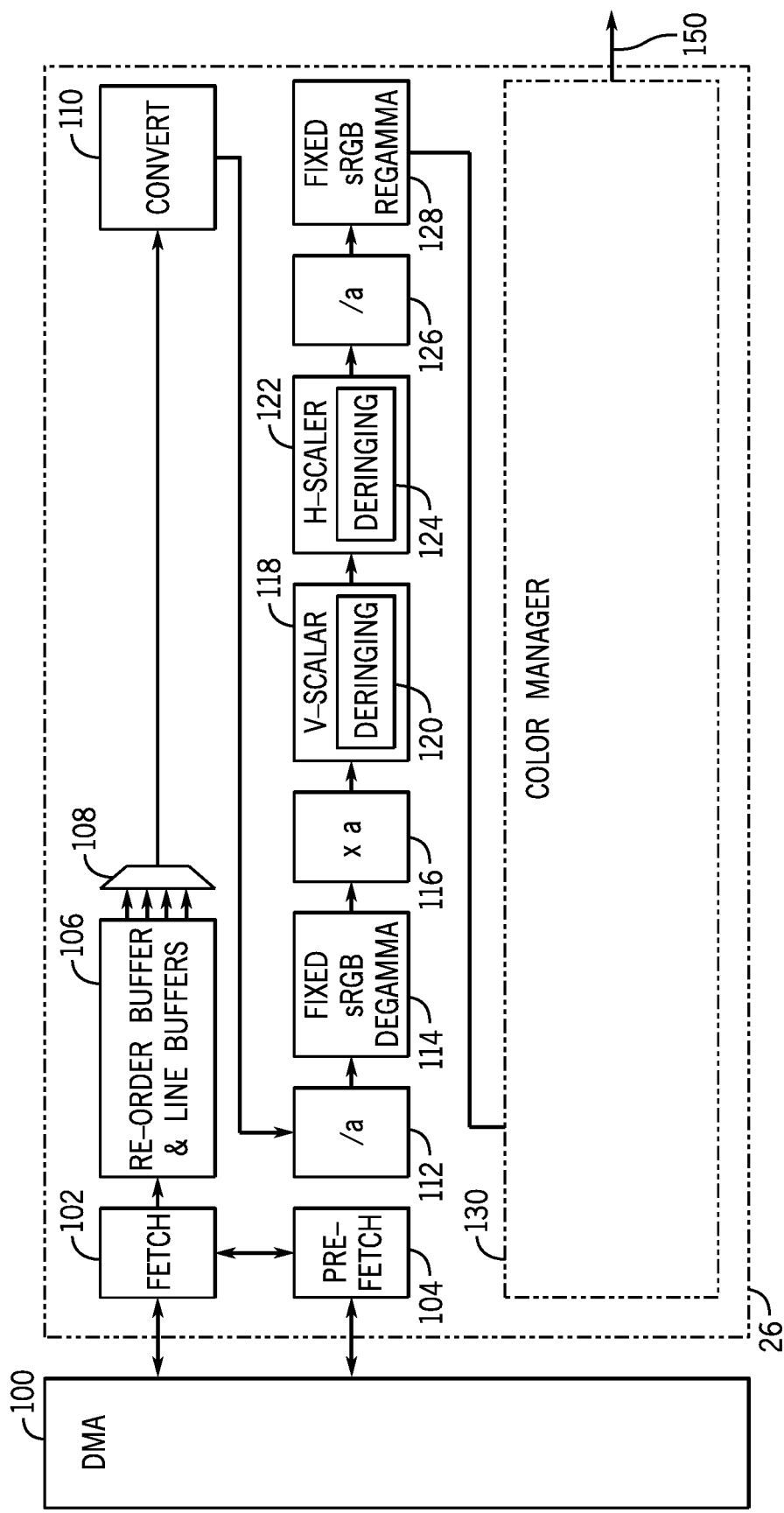
FIG. 7 is a block diagram of the display pipeline of FIG. 1 having one or more scalers and respective de-ringing circuitries, in accordance with an embodiment of the present disclosure.

FIG. 7 is a block diagram of embodiment of the display pipeline(s) 26. As illustrated, the display pipeline(s) 26 may fetch image data from a direct memory access (DMA) engine 100 via a fetch 102 and/or pre-fetch 104. Re-order buffer and line buffers 106 may be used to re-order the fetched data, which may be provided to a multiplexer 108 in certain embodiments.

A convert block 110 remaps all fixed-point source formats and half-precision formats to their equivalent values in another more-compact format to reduce a number of bits to be stored in the processing prior to any processing of the pixel values. During the conversion, programmable offsets may be applied during the conversion. For example, the offsets may be applied in an alpha-red-green-blue (ARGB) format. For instance, the offsets may be applied with an alignment (e.g., most significant bit or a least significant bit alignment) of the component values. A sign extension may be used after the offset is added. The conversion may use "divisions" that are realized as approximations using shifts and adds to avoid the use of long division hardware.

To ensure fixed de-gamma is performed on non-alpha-pre-multiplied content but not performed on other content when the linear scaling mode is enabled, a division by the alpha channel in a by-alpha divider 112 may be performed on each color channel of an alpha-pre-multiplied input pixel. This division process may be enabled by setting a corresponding flag. Similar to the divisions that are approximated in the convert block 110, the by-alpha divider 112 may approximate the division by alpha.

A de-gamma function may be applied prior to performing the scaling operations to enable linear scaling that provides a mathematically precise option for scaling. The number of source pixels that the vertical scaler is capable of consuming (e.g., up to 18 each cycle) may make it impractical to implement a fully programmable de-gamma function. Thus, a fixed implementation of the standard RGB (sRGB) de-gamma may be implemented in a fixed sRGB DeGamma block 114. The fixed sRGB DeGamma block 114 utilizes a non-equally spaced lookup table (LUT). An output of the fixed sRGB de-gamma is set using the stored values in the LUT (with or without LUT interpolation using a magnitude of the input).

If division by the alpha channel is enabled for the color channels in the by-alpha divider 112, the alpha channel may be re-multiplied in a by-alpha multiplier 116 into each color channel after the fixed de-gamma has been applied. The re-multiplication of the alpha channel enables scaling to be performed on the alpha-pre-multiplied content.

The display pipeline 26 also includes a vertical scaler 118 with a de-ringer 120 and a horizontal scaler 122 with a de-ringer 124. Thus, scaling in the display pipeline 26 may be split into two steps: vertical scaling and horizontal scaling. Furthermore, although the illustrated embodiment applies vertical scaling before applying horizontal scaling, some embodiments of the display pipeline 26 may apply vertical and horizontal scaling in a different order.

Figure 8:
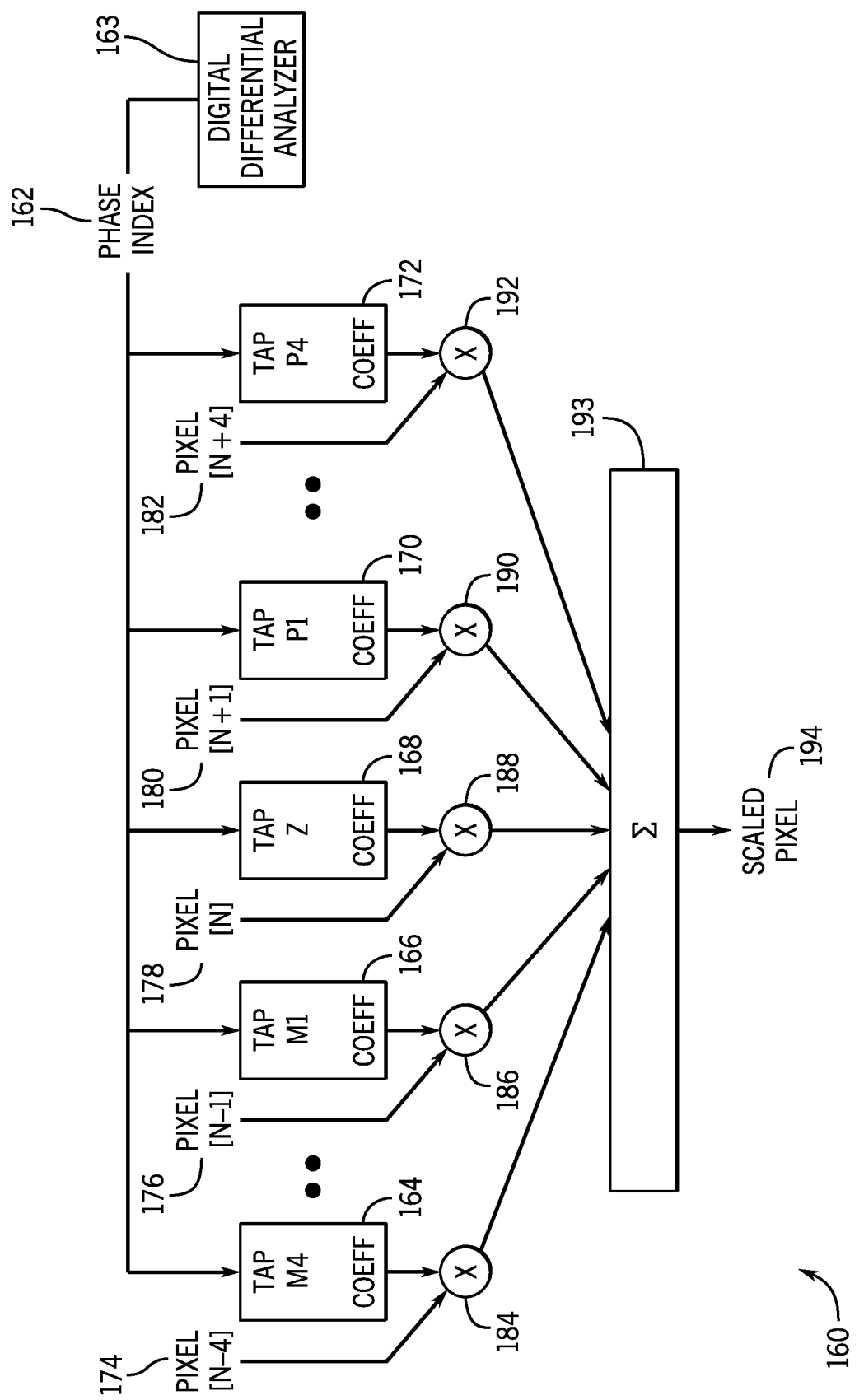
FIG. 8 is a block diagram of a scaler of the one or more scalers of FIG. 7, in accordance with an embodiment of the present disclosure.

The core filtering operation in the vertical scaler 118 and the horizontal scaler 122 is performed using a multi-tap polyphase filter that multiplies pixels from the source buffer by a weighting factor coefficient in generation of a scaled pixel. In some embodiments, the vertical scaler 118 and the horizontal scaler 122 may have a same number of taps (e.g., 9) and/or a same number of phases (e.g., 32) in respective filters. FIG. 8 illustrates an embodiment of a multi-tap polyphase filter 160 that may be used in the vertical scaler 118 or the horizontal scaler 122. In some embodiments, the vertical scaler 118 and/or the horizontal scaler 122 have a copy of the multi-tap polyphase filter 160 for each component of the image data (e.g., 4 filters) in the corresponding scaler. The multi-tap polyphase filter 160 utilizes a phase index 162 from a digital differential analyzer (DDA) 163 to determine coefficients for taps 164, 166, 168, 170, and 172. The phase index 162 may include a fully programmable lookup table (LUT) with entries selected based on a current fractional scale position from the DDA 163. Source pixels 174, 176, 178, 180, and 182 are determined from an integer portion of the scale position. The scaled values for the source pixels 174, 176, 178, 180, and 182 scaled using respective multipliers 184, 186, 188, 190, and 192 with corresponding coefficients in corresponding taps 164, 166, 168, 170, and 172 are added in a summing component 193 to output a scaled pixel 194. The summing component 193 may include hardware and/or software implementations. For example, the summing component 193 may be at least partially implemented using instructions executed by the processor 18. In some embodiments, the results of the summation may be clipped and/or rounded before output as the scaled pixel 194.

As previously noted, the DDA 163 indicates the scale position during the scaling operation. The DDA 163 may be implemented in hardware using a register with a number (e.g., 36) of bits with a 2 s-complement fixed-point number with a number (e.g., 16) of integer bits and a number (e.g., 20) of fractional bits. The integer portion of the DDA 163 indicates a center pixel position (e.g., for the source pixel 178).

The DDA 163 may be initialized using an initialization register which contains 32-bits (12 bits in the integer portion and 20 bits in the fraction portion). The initialization register may be programmed relative to the first pixel of the post-transform buffer. The DDA 163 value is then incremented by the value in a step register to obtain the position of the next output pixel. If the step value for a given component is less than a minimum value (e.g., 1.0), then the component is upscaled. If the step value is greater than the minimum value, then the component is downscaled. In the case of YCbCr sources with sub-sampled chroma, the source's chroma components may be upscaled while its luma components are downscaled or unscaled.

As previously noted, the vertical scaler 118 may include a multi-tap polyphase filter 160 for each component of the image data. However, when scaling YCbCr sources or ARGB sources lacking an alpha component, one of the filters may remain unused. For 2-plane YCbCr sources, two DDA values are used. One of the two DDA values is used for luma, and one of the two DDA values is used for the two chroma components. For boundary conditions, border pixels may be repeated and/or set to 0 to ensure availability of sufficient pixels to perform the filtering.

The horizontal scaler 122, like the vertical scaler 118, includes four separate multi-tap polyphase filters 160, one for each component. While only a single DDA may be used to control the scaling of ARGB sources, two DDAs 163 may be used for all YCbCr sources except for 4:4:4 1-plane image data. The two DDAs 163 may be used with one DDA 163 for the luma component and another DDA 163 for the two chroma components. For AYCbCr sources, the alpha component may use the same DDA 163 as that of the luma component. For boundary conditions, border pixels may be repeated and/or set to 0 to ensure availability of sufficient pixels to perform the filtering.

The vertical scaler 118 and the horizontal scaler 122 may support two primary modes of operation: standard scaling and linear scaling. Standard scaling simply involves passing the source pixels directly through the vertical scaler 118 and the horizontal scaler 122 as in a typical separable scaler. Standard scaling can be performed on both ARGB and (A)YCbCr sources. Linear scaling is an option to perform a mathematically precise scaling by converting the source pixels from non-linear (gamma-encoded) space to linear space using the de-gamma function prior to performing the scaling operations. In some embodiments, linear scaling is only supported for ARGB sources since linear scaling of YCbCr sources uses both chroma upsampling and color space conversion logic prior to the vertical scaler 118 and horizontal scaler 122.

The vertical scaler 118 and the horizontal scaler 122, along with other portions of the display pipeline 26, may support various full and partial bypass modes, with the partial bypass modes only useable by certain sources (e.g., certain (A)YCbCr sources). A no-scaling mode is an operational mode that can be used when no scaling of any component is to be applied, the scale region is equal to the destination region, and all pixels in the scale region are also in an active region. In this mode each output line is composed of pixels from a single source line, and as such the line buffers functionally hold entire output lines. Enabling the no-scaling mode allows the display pipeline 26 to bypass the vertical scaler 118 and the horizontal scaler 122 and to aggregate a number (e.g., 9) lines worth of requests, providing a significant decrease in power consumption.

A scale-bypass mode is a mode similar to the no-scaling mode except that the scale-bypass mode does not treat line buffers differently from how they are used in normal operation. As such scale-bypass may be used when no scaling of any component is to be applied and the scale region is equal to the destination region. Thus, the scale-bypass mode may be used when some of the pixels in the scale region are not in the active region, and the no-scaling mode is unavailable.

The convert block 110 remains active in the no-scaling and scale-bypass modes. Under normal operating configurations other than pass-through modes, ARGB formats may use the no-scaling and scale-bypass modes. On the other hand, (A)YCbCr formats use the no-scaling and scale-bypass modes if the (A)YCbCr format has no chroma subsampling, such as 4:4:4.

A no-vertical scaling mode that allows 2-plane 4:2:2 (A)YCbCr sources to take advantage of the power savings achieved via no-scaling mode fetching. The no-vertical scaling mode is available when no vertical scaling of any component is to be applied, the luma and chroma scale region heights are equal to the destination region height, and the source is 2-plane 4:2:2.

As with the no-scaling mode each output line includes pixels from a single source line of each plane so that the number (e.g., 9) line buffers hold the number of entire output lines, albeit lines that have not yet been scaled horizontally. Enabling the no-vertical scaling mode allows the display pipeline 26 to bypass the vertical scaler 118 and to aggregate the number of lines worth of requests, providing a significant decrease in power consumption.

A Lmscale-bypass mode is a luma scale bypass mode that allows the luma component to entirely bypass the vertical scaler 118 and the horizontal scaler 122 to save power. This mode may be used alone or in conjunction with the no-vertical scaling mode (for 4:2:2 sources). The Lmscale-bypass mode may be used when no scaling of luma is required is to be performed, the luma scale region is equal to the Destination Region, the no-scaling and scale-bypass modes are disabled, and the source is 2-plane 4:2:2/4:2:0 (A)YCbCr.

When the image data has sharp transitions, scaling the image data with the vertical scaler 118 and/or horizontal scaler 122 may result in ringing artifacts. To mitigate the ringing artifacts that may occur when scaling content with sharp transitions, a scaler de-ringing mode may be enabled in the de-ringers 120 and 124. The scaler de-ringing modes may be enabled separately in the vertical scaler 118 and/or the horizontal scaler 122 using different respective registers. The de-ringers 120 and 124 detect areas with sharp transitions around which ringing artifacts are expected.

Figure 9:
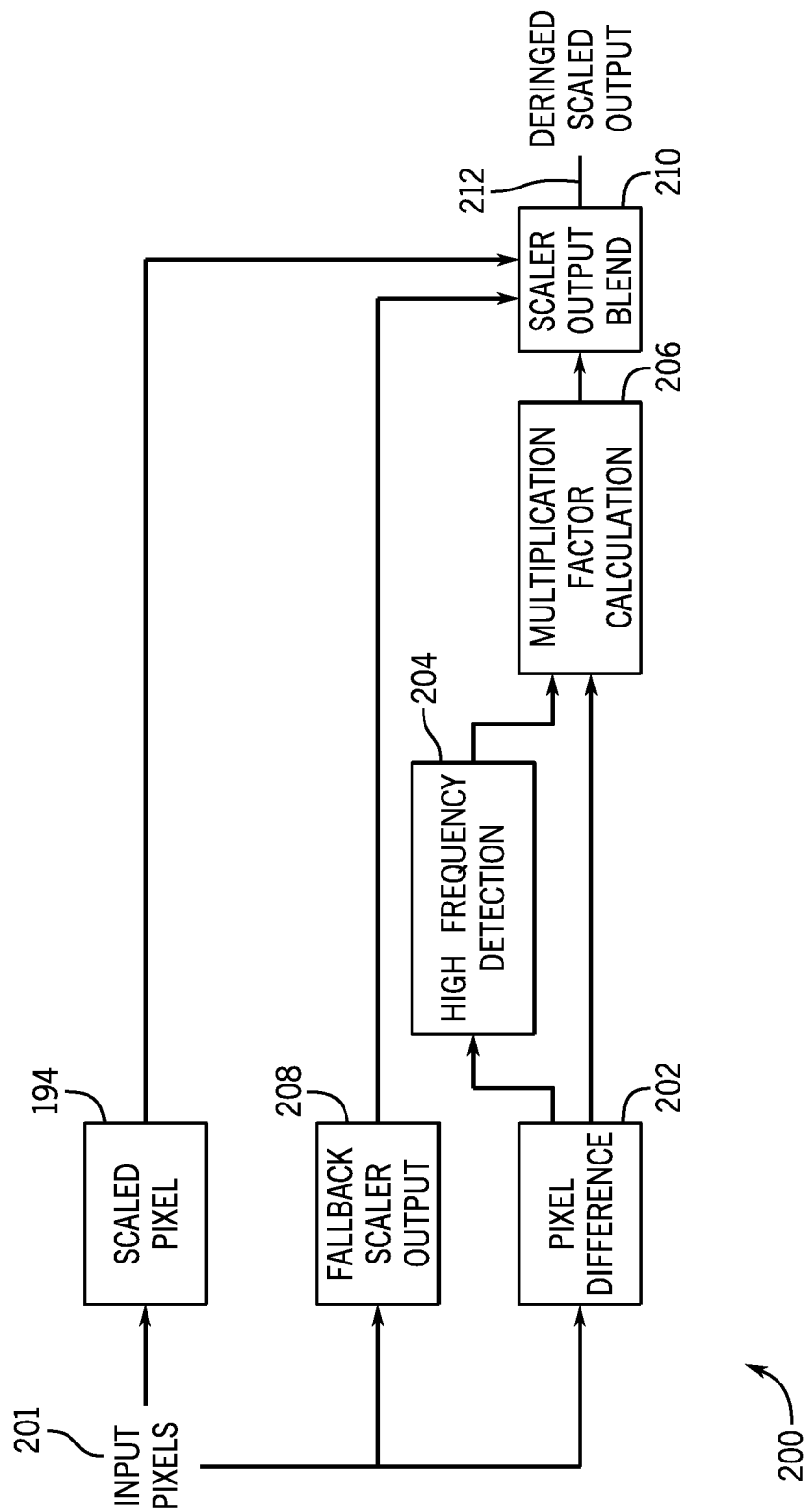
FIG. 9 is a block diagram of the de-ringing circuitry of FIG. 7 using a main beam sweep, in accordance with an embodiment.

FIG. 9 is a block diagram of a de-ringer 200 that may be used to implement the de-ringers 120 and/or 124. As illustrated, the de-ringer 200 receives input pixels 201, such as the pixels 174, 176, 178, 180, and 182.

Figure 10:
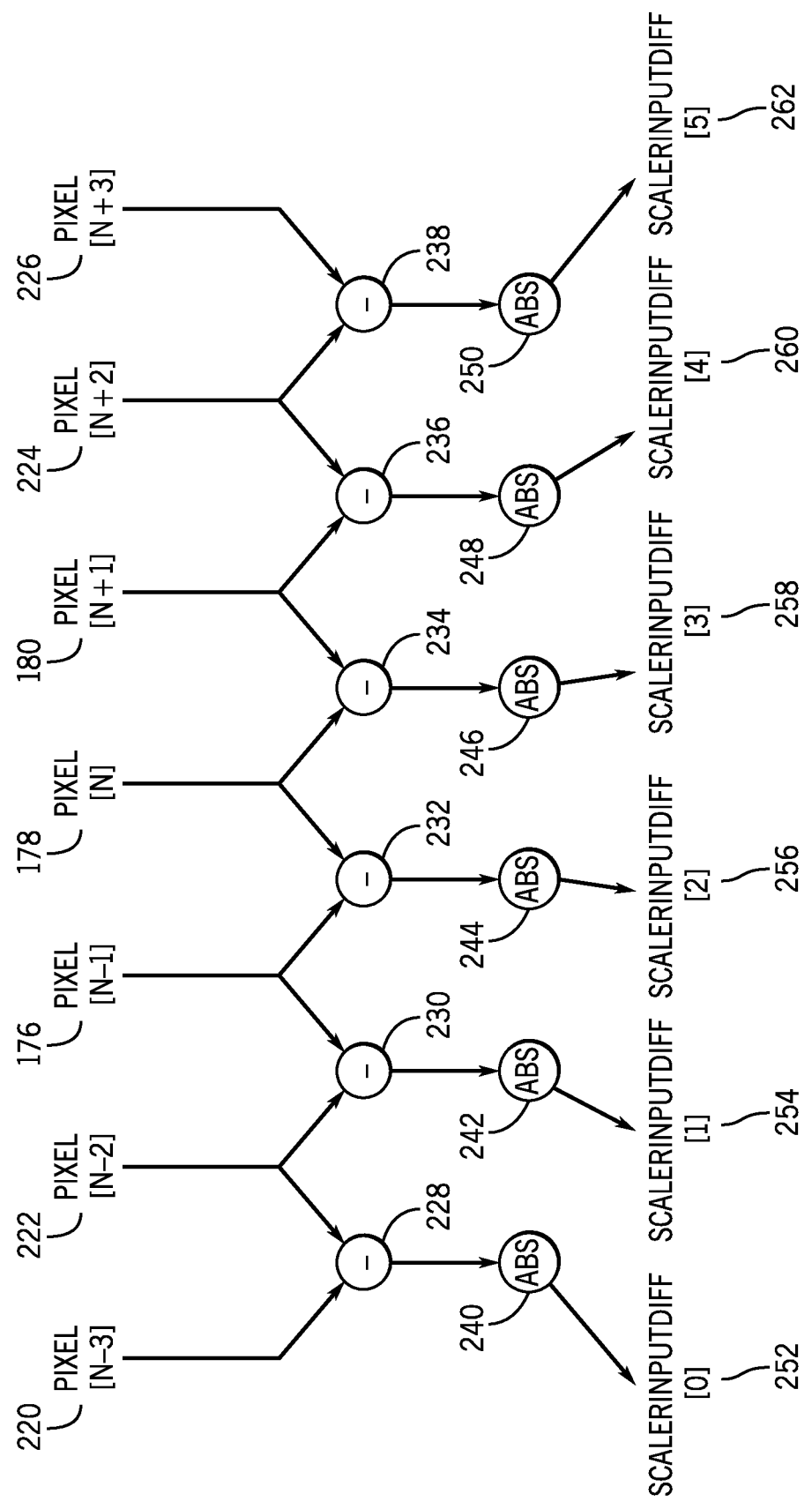
FIG. 10 is an illustration of the main beam sweep of FIG. 9, in accordance with an embodiment.

The input pixels 201 are transmitted to a pixel differences circuitry 202. The pixel differences circuitry 202 uses a pixel-wise difference calculation on a local neighborhood of pixels to enable edge detection. For instance, the local neighborhood of pixels may be defined to be a subset of the input pixels (e.g., pixels 174, 176, 178, 180, and 182) used in the multi-tap polyphase filter 160. For example, FIG. 10 illustrates schematic diagram of an embodiment of the pixel differences circuitry 202. As illustrated, the pixel differences circuitry 202 receives the pixels 176, 178, and 280. The pixel differences circuitry 202 also receives pixels 220, 222, 224, and 226 as part of the input pixels 201. Adjacent pixels are compared. For instance, pixel 220 may be subtracted from pixel 222 (or vice versa) in subtractor 228; pixel 222 may be subtracted from pixel 176 (or vice versa) in subtractor 230; pixel 176 may be subtracted from pixel 178 (or vice versa) in subtractor 232; pixel 178 may be subtracted from pixel 180 (or vice versa) in subtractor 234; pixel 180 may be subtracted from pixel 224 (or vice versa) in subtractor 236; and pixel 224 may be subtracted from pixel 226 (or vice versa) in subtractor 238. Furthermore, although the illustrated pixel differences circuitry 202 compares seven different pixels, other embodiments of the pixel differences circuitry 202 may use a different number of pixels.

Since the ringing artifacts may occur with sharp transitions from either direction, an absolute value may be calculated of the results of the subtractions to find a signless pixel difference between adjacent pixels. For instance, an absolute value may be calculated from a result of the subtractor 228 in absolute value calculator 240. Similarly, absolute value calculator 242 may calculate an absolute value from a result of the subtractor 230; absolute value calculator 244 may calculate an absolute value from a result of the subtractor 232; absolute value calculator 246 may calculate an absolute value from a result of the subtractor 234; absolute value calculator 248 may calculate an absolute value from a result of the subtractor 236; absolute value calculator 250 may calculate an absolute value from a result of the subtractor 238. The output of the absolute value calculator 240 is output from the pixel differences circuitry 202 as a scaler input differential 252. The output of the absolute value calculator 242 is output from the pixel differences circuitry 202 as a scaler input differential 254. The output of the absolute value calculator 244 is output from the pixel differences circuitry 202 as a scaler input differential 256. The output of the absolute value calculator 246 is output from the pixel differences circuitry 202 as a scaler input differential 258. The output of the absolute value calculator 248 is output from the pixel differences circuitry 202 as a scaler input differential 260. The output of the absolute value calculator 250 is output from the pixel differences circuitry 202 as a scaler input differential 262.

Returning to FIG. 9, the outputs of the pixel differences circuitry 202 are transmitted to a high-frequency detector 204. While using linear interpolation as a scaling filter mitigates ringing, linear interpolation has poor falloff and aliasing suppression when compared to multi-tap polyphase filtration. As a result of the poor falloff and aliasing suppression, linear interpolation produces noticeable aliasing artifacts in high frequency patterns. Therefore, the high-frequency detector 204 is configured to detect high local spatial frequency when downscaling and to favor the original polyphase output at these points.

When downscaling high-frequency content (e.g., near the Nyquist frequency), the de-ringer 200 may fall back to using the original polyphase scaler output (e.g., scaled pixel 194) when high frequency detection is enabled. When upsampling or when high frequency detection logic is disabled, a calculated blend ratio is used. A score for local spatial frequency may be calculated and thresholded to determine a factor used to determine which output to skew the proportion of the output towards.

The pixel differences and indication of whether a high frequency has been detected are transmitted to a multiplication factor calculator 206 to determine a multiplication factor that is used to determine how to calculate a de-ringed output. The differences are categorized into an outer difference (2 pixel distance from center pixel) and an inner difference (1 pixel distance from center pixel), which are thresholded and used in calculations as shown below to determine the blend factor or multiplication factor between the scaled pixel 194 and a fallback scaler output 208 to be used when the scaled pixel 194 is not used.

Using the multiplication factor, the de-ringers 120 and 124 utilize a scaler output blender 210 to blend and/or weight between the scaled pixel 194 and the fallback scaler output 208 in determining a de-ringed scaled output 212.

Returning to FIG. 7, an output from the horizontal scaler 122 is transmitted to an additional by-alpha divider 126. If an additional multiplication of the alpha channel into the color channels is enabled in the by-alpha multiplier 116 to ensure scaling can be done on alpha pre-multiplied content, the by-alpha divider 126 may invert this operation. The inversion is done to ensure that the fixed engamma is not performed on alpha-pre-multiplied content. The additional division is enabled by a parameter value. The division performed in the by-alpha divider 126 may function similar to the by-alpha divider 112.

A fixed sRGB re-gamma block 128 may be used to invert any de-gamma applied in the fixed sRGB degamma block 114 when linear scaling is enabled for sources that were not encoded with an sRGB gamma, but something similar/close. The fixed sRGB re-gamma function may utilize a non-equally spaced LUT.

The display pipeline 26 also includes a color manager 130 that is used to perform color management on image content. The color manager may include a color space conversion (CSC) block that performs a transform that uses input offsets, a matrix multiplication, output offsets, and output clip limits to convert between color spaces. The color manager 130 may include one or more gamma and/or de-gamma blocks. The de-gamma blocks may be used to apply a de-gamma function to encoded signals (e.g., hybrid log-gamma (HLG)) to a linear function. The de-gamma may utilize a square operation for a bottom half of a range and an equally spaced LUT for a top half of the range.

The color manager 130 may include tone mapping to apply input offsets, apply matrix (e.g., 3×3) multiplication, apply output offsets, and/or output clip limits before tone mapping is applied. The tone mapping maps image content to a different tone. After tone mapping is applied, the color manager 130 may be used to apply input offsets, a matrix (e.g., 3×3) multiplication, output offsets, and output clip limits.

The color manager 130 may include a de-gamma LUT that converts pixels from non-linear, gamma-encoded space to linear space using a programmable LUT and linear interpolation between LUT entries. The color manager 130 may include a transform block (e.g., 3×3 transform) used to apply input offsets, a matrix multiplication, output offsets, and output clip limits after de-gamma LUT conversion using the LUT. The color manager 130 may also include a soft clip module that executes clipping with color hue preservation by dividing all values of RGB to a maximum of absolute values in case of any of them exceeding a threshold. Since the values are restricted to positive values and in expected ranges, an approximation may be made using the Newton-Raphson method. When the color manager 130 performs de-gamma using the LUT, the color manager may include re-gamma LUT that may be used to convert pixels from linear space to a non-linear, gamma-encoded space using a programmable LUT and linear interpolation between the LUT entries.

Finally, the color manager 130 may output color managed scaled and de-ringed data as output data 150. Furthermore, the output data 150 may from one display pipeline 26 may be blended with the output data 150 of other display pipelines 26. Additionally, the blending of the output data 150 from multiple display pipelines 26 may be disabled for at least some modes of operation.

The foregoing discussion regarding various elements may be implemented using hardware, software, and/or firmware. Furthermore, some elements may include bypass modes where they are optionally applied to the image content. Additionally or alternatively, some elements may be omitted from some embodiments of the electronic device 10.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
   receiving, at de-ringing circuitry of a display pipeline of an electronic device, scaled image content based on image data, wherein the scaled image content comprises linearly scaled content;
   receiving, at the de-ringing circuitry, a fallback scaler output, wherein the fallback scaler output comprises non-linearly scaled content;
   determining whether the image data has a change frequency greater than a threshold, wherein the change frequency comprises differences between adjacent pixels using pixel difference circuitry that comprises a plurality of subtractors and absolute value circuitries configured to determine sign-less differences between the adjacent pixels in the image data;
   in response to the change frequency being above the threshold, determining a weight based on the linearly scaled content and the non-linearly scaled content; and
   blending the scaled image content and the fallback scaler output based at least in part on the weight.

2. The method of claim 1, wherein the scaled image content is scaled in a scaler of the display pipeline.

3. The method of claim 2, wherein the scaled image content comprises horizontally scaled image content from the scaler, wherein the scaler comprises a horizontal scaler.

4. The method of claim 2, wherein the scaled image content comprises vertically scaled image content from the scaler, wherein the scaler comprises a vertical scaler.

5. The method of claim 1, comprising receiving the image data at the de-ringing circuitry.

6. The method of claim 1, wherein determining whether the change frequency is greater than the threshold comprises determining whether the change frequency is lower than an additional threshold.

7. The method of claim 6, wherein determining the weight comprises determining a bin based at least in part on the change frequency being between the threshold and the additional threshold.

8. The method of claim 7, wherein determining the weight is based at least in part on the bin.

9. A display pipeline system of an electronic device, comprising:
   scaler circuitry configured to generate scaled image content by scaling image data using a first scaling process and to generate a fallback scaler output using a second scaling process, wherein the first scaling process comprises linear scaling, and the second scaling process comprises non-linear scaling; and
   de-ringing circuitry comprising pixel difference circuitry, coupled to the scaler circuitry and configured to:
      receive the scaled image content from the scaler circuitry;
      receive the fallback scaler output from the scaler circuitry;
      determine a change frequency of the image data, wherein determining the change frequency comprises determining differences in adjacent pixels in the image data using a plurality of subtractors and absolute value circuitries to determine sign-less differences between the adjacent pixels in the image data;
      blend the scaled image content and the fallback scaler output using one or more weights based on the change frequency; and
      output de-ringed scaled content based on the change frequency, the one or more weights, the scaled image content, and the fallback scaler output.

10. The display pipeline system of claim 9, wherein the de-ringing circuitry comprises additional scaler circuitry, wherein the scaler circuitry is configured to scale the image data in a vertical direction, and the additional scaler circuitry is configured to scale the image data in a horizontal direction.

11. The display pipeline system of claim 9, wherein the scaler circuitry uses linear-interpolation-based scaling to generate the scaled image content.

12. The display pipeline system of claim 9, wherein the de-ringing circuitry is configured to receive the image data.

13. The display pipeline system of claim 9, wherein the de-ringing circuitry comprises frequency detection circuitry configured to determine the change frequency based at least in part on the sign-less differences between the adjacent pixels.

14. The method of claim 1, wherein the fallback scaler output corresponds to a first level of scaling, and the scaled image content corresponds to a second level of scaling.

15. The method of claim 14, wherein the first level of scaling is lower than the second level of scaling.

16. The display pipeline system of claim 9, wherein the fallback scaler output corresponds to a first level of scaling, and the scaled image content corresponds to a second level of scaling.

* * * * *